United States Patent
Kusakari et al.

(10) Patent No.: US 6,793,354 B2
(45) Date of Patent: Sep. 21, 2004

(54) VANITY MIRROR DEVICE FOR TRUNK

(75) Inventors: Hidehiko Kusakari, Saitama (JP); Hiroyasu Oomori, Saitama (JP)

(73) Assignee: Honda Access Corporation, Saitama (JP)

( * ) Notice: Subject to any disclaimer, the term of this patent is extended or adjusted under 35 U.S.C. 154(b) by 0 days.

(21) Appl. No.: 10/373,188

(22) Filed: Feb. 26, 2003

(65) Prior Publication Data

US 2004/0032674 A1 Feb. 19, 2004

(30) Foreign Application Priority Data

Aug. 16, 2002 (JP) .......................................... 2002-237553
Aug. 16, 2002 (JP) .......................................... 2002-237554

(51) Int. Cl.[7] ................................................. G02B 5/08
(52) U.S. Cl. ........................................................ 359/842
(58) Field of Search ................................. 359/841, 842, 359/844, 871, 872; 248/476, 479

(56) References Cited

U.S. PATENT DOCUMENTS 4,824,159 A * 4/1989 Fluharty et al. ............ 359/841
6,092,704 A * 7/2000 Baumeister ................. 224/275

* cited by examiner

*Primary Examiner*—Euncha P. Cherry
(74) *Attorney, Agent, or Firm*—Arent Fox PLLC

(57) ABSTRACT

A vanity mirror device for a trunk includes: a back plate of a vanity mirror, which is carried on an inner wall of a trunk lid, so that it can be turned between a housed position and any use position; and a clip device mounted on the back plate for grasping a retaining shaft provided on the inner wall of the trunk lid when the back plate is at the housed position. The clip device includes: a pair of resilient finger portions rising from the back plate and intersecting each other immediately before the retaining shaft; and claw portions which are formed at tip ends of the resilient finger portions and which are brought into engagement with opposite side of the retaining shaft by resilient forces of the resilient finger portions. Thus, it is possible to easily return the vanity mirror to the housed position, while increasing the retaining force for the vanity mirror when it is in a housed state.

7 Claims, 9 Drawing Sheets with wide US 6,793,354 B2

VANITY MIRROR DEVICE FOR TRUNK

BACKGROUND OF THE INVENTION

1. Field of the Invention

The present invention relates to a vanity mirror device for a trunk, which is mounted on a trunk lid mounted to a motorcycle or the like and which is used to give care to personal appearance, and particularly to an improvement in a vanity mirror device including a back plate of a vanity mirror, which is carried on a pivot mounted on a trunk lid, so that it can be turned between a housed position in which the vanity mirror is superposed on an inner wall of the trunk lid and any use position, and a clip means mounted on the back plate for grasping a retaining shaft provided on the inner wall of the trunk lid in the housed position of the back plate.

2. Description of the Related Art

In a conventional vanity mirror device for a trunk, a clip means is constructed of a pair of clip pieces rising in parallel from a back of a back plate so that a retaining shaft provided on a trunk lid is resiliently grasped by the clip pieces, thereby retaining a vanity mirror in a housed position.

There are the following two conflicting requirements for the clip means: a force for retaining the vanity mirror is increased so that the vanity mirror is prevented from voluntarily turning due to a vibration or the like in the housed state of the vanity mirror, on one hand, and the vanity mirror can be easily returned to the housed position after use, on the other hand. In the conventional vanity mirror device, it is difficult to satisfy these requirements simultaneously.

SUMMARY OF THE INVENTION

Accordingly, it is an object of the present invention to provide a vanity mirror device for a trunk, wherein the above two requirements can be satisfied, and the vanity mirror can be easily returned to the housed position, while increasing the force for retaining the vanity mirror in the housed state thereof.

To achieve the above object, according to a first feature of the present invention, there is provided a vanity mirror device for a trunk, comprising: a back plate of a vanity mirror, which is carried on a pivot mounted on an inner wall of a trunk lid, so that it can be turned between a housed position in which the vanity mirror is superposed on the inner wall of the trunk lid and any use position; and a clip means mounted on the back plate for grasping a retaining shaft provided on the inner wall of the trunk lid in the housed position of the back plate, wherein the clip means is constructed of at least a pair of clip pieces comprising: a pair of resilient finger portions rising from the back plate and intersecting each other immediately before the retaining shaft; and claw portions formed at tip ends of the resilient finger portions and brought into engagement with one side of the retaining shaft opposite from base ends of the resilient finger portions by resilient forces of the resilient finger portions.

With the first feature, when the retaining shaft is pushed into between the claw portions, the resilient finger portions are flexed to widen the space between the claw portions, so that the retaining shaft can be pushed into between the claw portions by a relatively small force. On the other hand, when the clip pieces grasping the retaining shaft are pulled away from the retaining shaft, the resilient finger portions are flexed to narrow the space between the claw portions, so that the frictional resistance between the claw portions and the retaining shaft is increased, leading to an increase in forces of the clip pieces for retaining the retaining shaft. Thus, it is possible to increase the retaining forces in the housed position of the vanity mirror, while enabling the easy returning of the vanity mirror from the use position to the housed position.

According to a second feature of the present invention, in addition to the first feature, the back plate is made of a synthetic resin, and has crank-shaped slits defined therein so that each of the clip pieces is formed by a portion of the back plate.

With the second feature, the integral formation of the back plate and the clip pieces can be carried out easily.

According to a third feature of the present invention, in addition to the second feature, finger-put portions are provided at corners of the back plate spaced apart from the clip pieces in an axial direction of the retaining shaft so that a user can put his fingers on the finger-put portions to turn the vanity mirror to the use position.

With the third feature, to operate the vanity mirror from the housed position to any use position, the user pulls the finger-put portion at left or right corner of a lower portion of the back plate to provide a slight resilient deformation to the back plate made of the synthetic resin, whereby the claw portions of the pair of clip pieces are disengaged from the retaining shaft sequentially from one side. Therefore, the clip pieces can be disengaged from the retaining shaft by a relatively small operating force.

According to a fourth feature of the present invention, in addition to any of the first to third features, the vanity mirror is constructed by coupling a mirror support supporting the mirror to the back plate, and a cushion member is interposed between the back plate and the mirror support.

With the fourth feature, even when the vanity mirror has been returned vigorously from the use position to the housed position, a shock force generated at that time can be absorbed by the cushion member between the back plate and the mirror, thereby suppressing the generation of an abnormal sound due to the shock vibration of the back plate.

According to a fifth feature of the present invention, in addition to the first feature, a pair of bearing members rotatably supported on the pivot are secured to the back plate of the vanity mirror, and a retaining member is mounted to the back plate, the retaining member comprising a pair of resilient clamping plates which are connected to each other into a U-shape and which are capable of clamping opposite sides of the pivot between the bearing members to retain the vanity mirror in any use position.

With the fifth feature, when the user turns the vanity mirror, the bearing members on the back plate are turned about the pivot, so that the pair of resilient clamping plates of the retaining member simultaneously rotate and continue to clamp an outer peripheral surface of the pivot while sliding thereon. If the user then releases his hand from the vanity mirror at a desired use position, the resilient clamping plates opposed to each other generates a rotational resistance due to the friction between the clamping plates and the pivot by their clamping forces, whereby the vanity mirror can be retained at the use position. Especially, the resilient clamping plates always exhibit constant clamping forces to the pivot, and hence the rotational resistance to the pivot is always stabilized, irrespective of the magnitude of the frictional resistance between the bearing members and the pivot. Therefore, the vanity mirror can be reliably retained at any use position, leading to an enhancement in assemblability. Moreover, the retaining member is placed utilizing a relatively large space between the pair of bearing members, and hence an increase in size of the vanity mirror device can be avoided.

According to a sixth feature of the present invention, in addition to the fifth feature, a tip end of each of the resilient clamping plates is divided by a plurality of slits into a plurality of resilient pieces each of which is independently brought into pressure-contact with the pivot.

With the sixth feature, each of the resilient clamping plates can be reliably brought over its entire width into pressure-contact with the pivot, whereby the frictional resistance between each of the resilient clamping plates and the pivot can be further stabilized. In addition, the force of pressure-contact between each resilient clamping plate and the pivot can be regulated by adjusting the width of the slits.

According to a seventh feature of the present invention, in addition to the fifth or sixth feature, the retaining member has a pair of ear portions integrally formed at its opposite sides and secured along with the bearing members to the back plate by common securing members.

The common securing members correspond to a bolt 24 and a nut 25 in an embodiment of the present invention, which will be described hereinafter.

With the seventh feature, it is possible to provide a reduction in the number of parts by use of the securing members which are common for the bearing members and the retaining member, thereby providing a further enhancement in assemblability and a reduction in cost.

The above and other objects, features and advantages of the invention will become apparent from the following description of the preferred embodiment taken in conjunction with the accompanying drawings.

DESCRIPTION OF THE PREFERRED EMBODIMENT

The present invention will now be described by way of a preferred embodiment with reference to the accompanying drawings.

Figure 1:
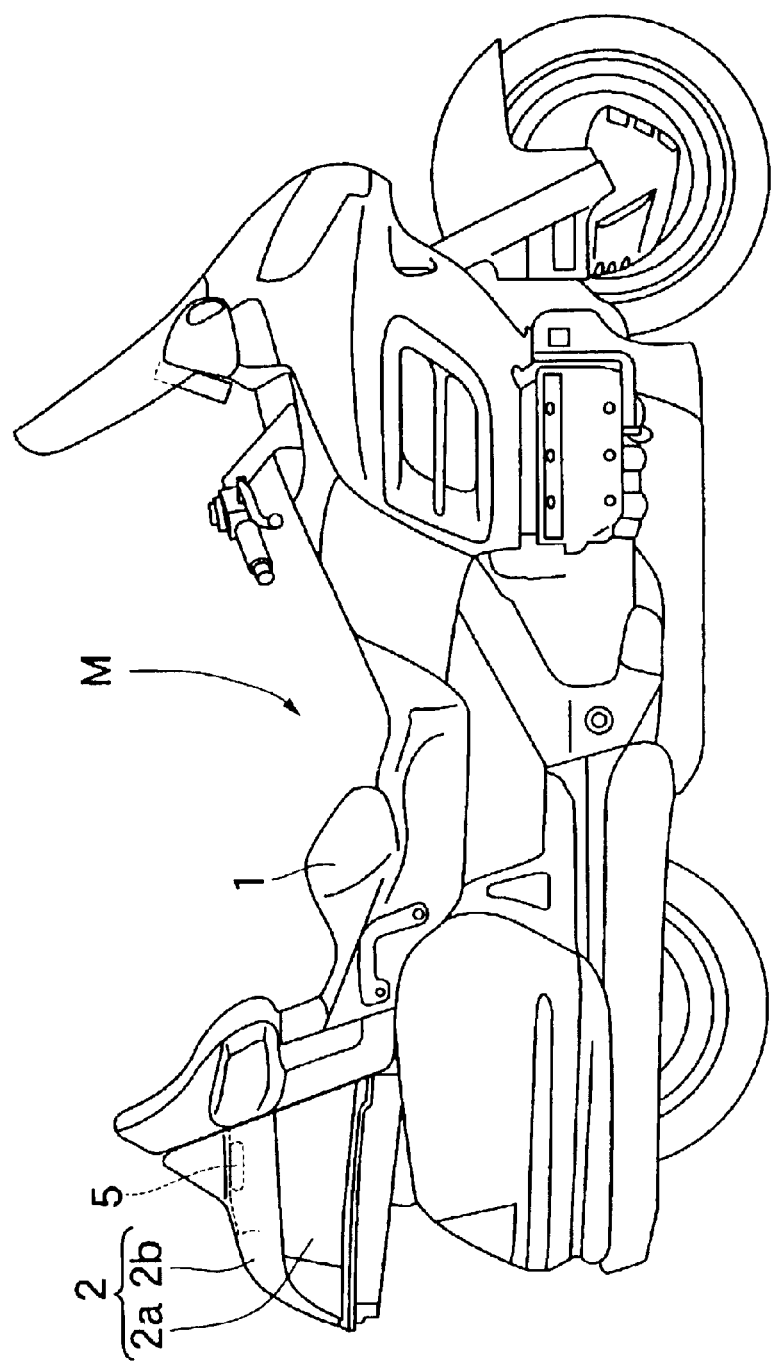
FIG. 1 is a side view of a motorcycle provided with a trunk to which the present invention is applied.
Figure 2:
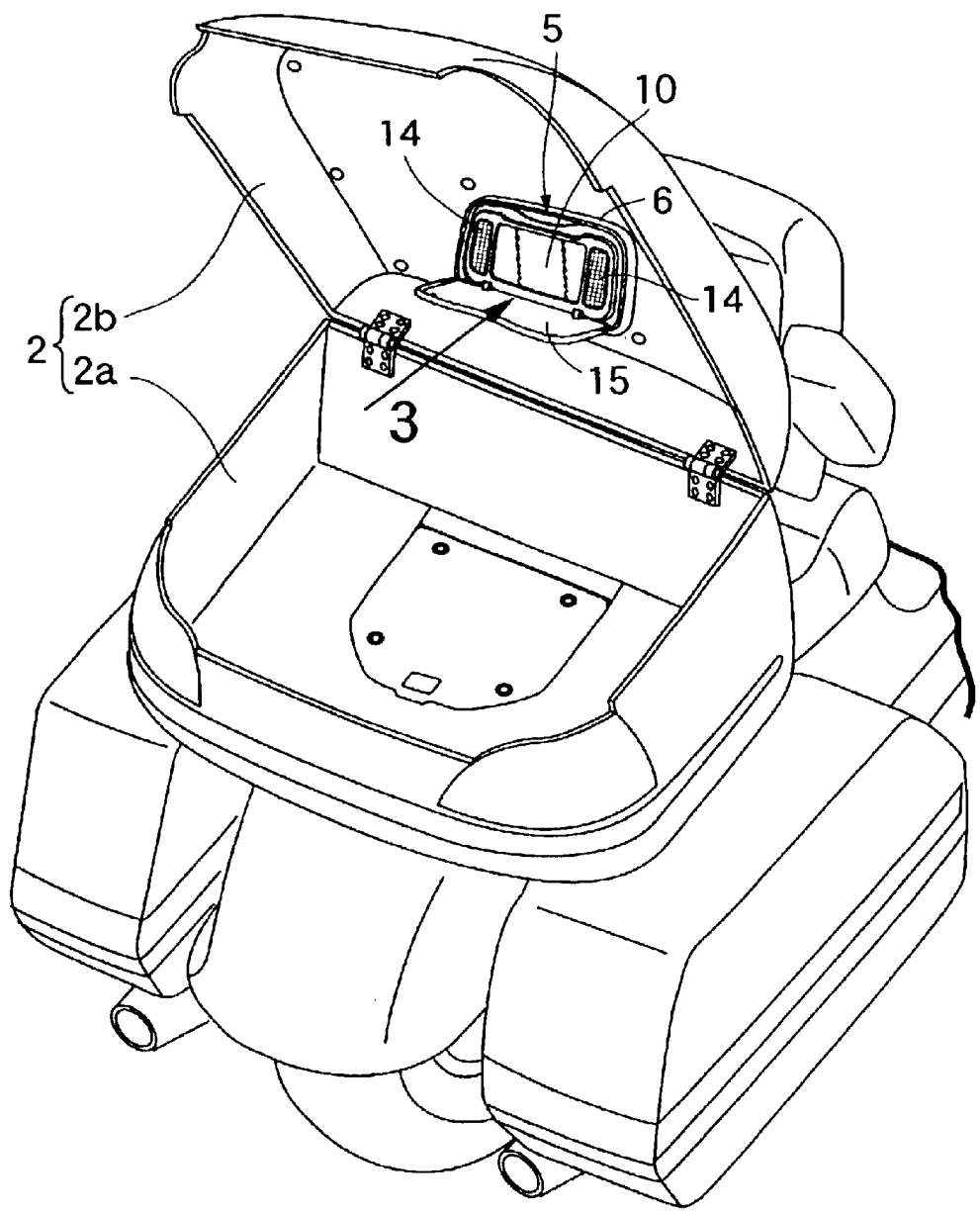
FIG. 2 is a perspective view showing a vanity mirror in a used state with the trunk in an opened state shown in FIG. 1.

Referring first to FIGS. 1 and 2, a trunk 2 is mounted on a vehicle body of a motorcycle M at a location in the rear of a seat 1. The trunk 2 comprises a trunk box 2a fixed to the vehicle body, and a trunk lid 2b pivotally supported at a front end of the trunk box 2a to be opened and closed. A vanity mirror 5 is mounted to an inner wall of the trunk lid 2b.

Figure 3:
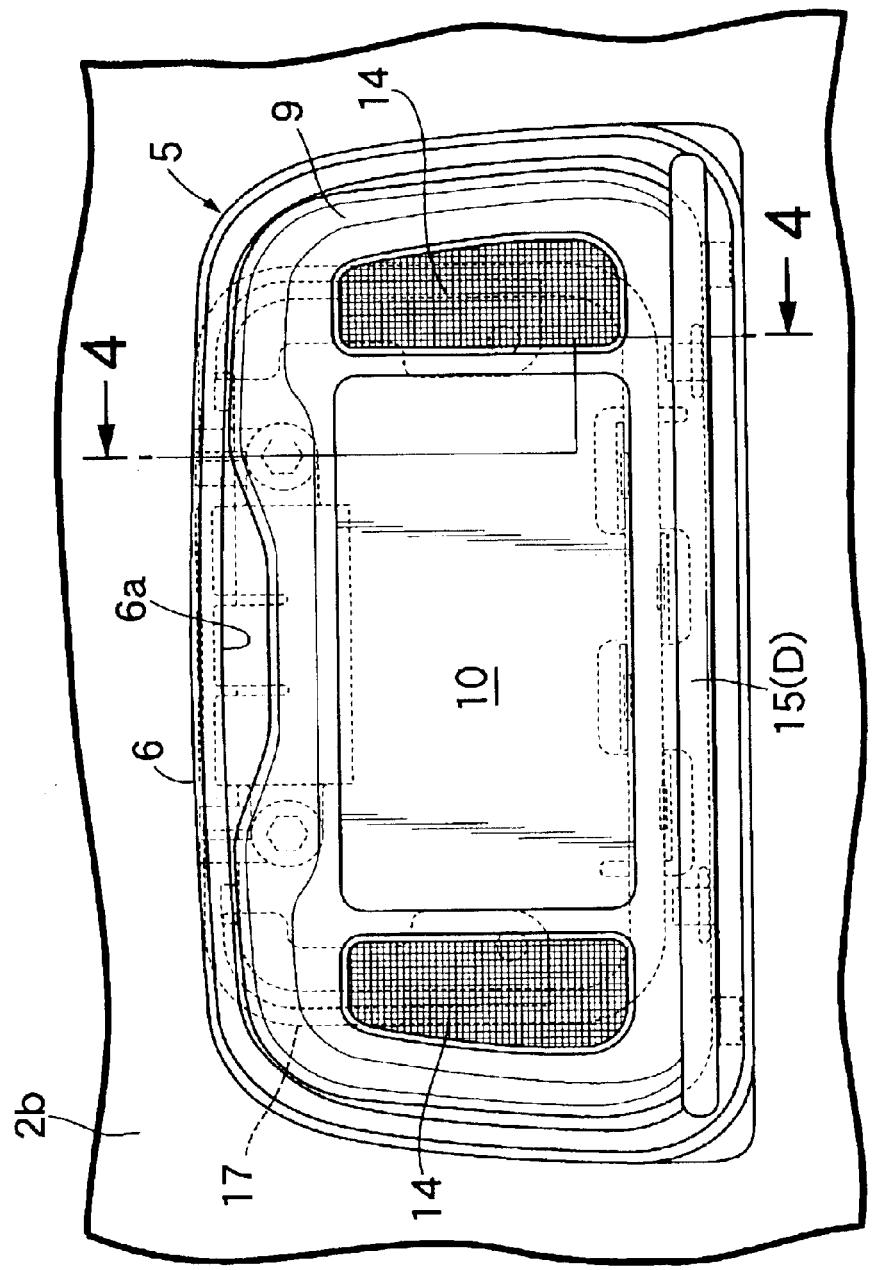
FIG. 3 is a view taken in a direction of an arrow 3 in FIG. 2.
Figure 4:
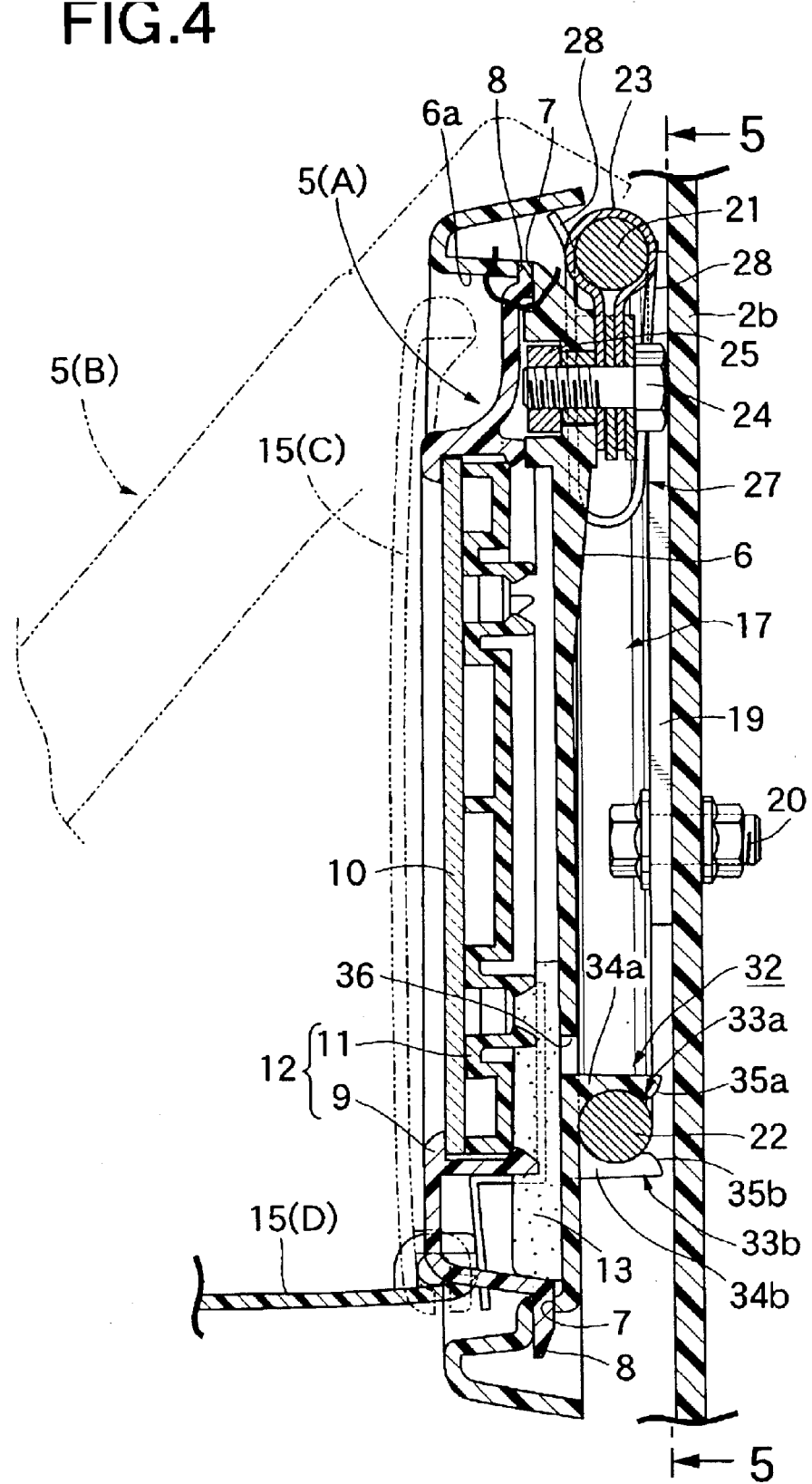
FIG. 4 is a sectional view taken along a line 4—4 in FIG. 3.

As shown in FIGS. 3 and 4, the vanity mirror 5 comprises: a laterally longer oblong back plate 6 made of a synthetic resin; a picture-frame-shaped support frame 9 which is made of a synthetic resin and accommodated in an oblong shallow recess 6a defined in a front surface of the back plate 6, and which is coupled to the back plate 6 by a plurality of locking claws 8 resiliently engaged in a plurality of locking bores 7 in an inner wall of the recess 6a; a mirror plate 10 with its mirror surface facing the inside of a picture-frame-shaped portion of the support frame 9; and a retaining plate 11 connected to the support frame to clamp the mirror plate 10 by cooperation with the support frame 9. A mirror support 12 for retaining the mirror plate 10 is constructed by the support frame 9 and the retaining plate 11. A cushion member 13 made of a foamed urethane or the like is interposed in a compressed state between the mirror support 12 and the back plate 6.

A pair of left and right lamp units 14, 14 are mounted to the support frame 9 with the mirror plate 10 interposed between the lamp units 14, 14. Further, a cover 15 made of a synthetic resin is pivotally supported on the support plate 9 so that it can be turned between a closed position C in which it covers the mirror surface of the mirror plate 10 and the lamp units 14, 14, and an opened position D in which it opens the mirror surface and the lamp units 14, 14. A click stopper (not shown) for retaining the cover 15 in the closed position C and the opened position D is mounted between the cover 15 and the support frame 9.

The mounting structure of the vanity mirror 5 to the trunk lid 2b will be described below with reference to FIGS. 4 to 7.

Figure 5:
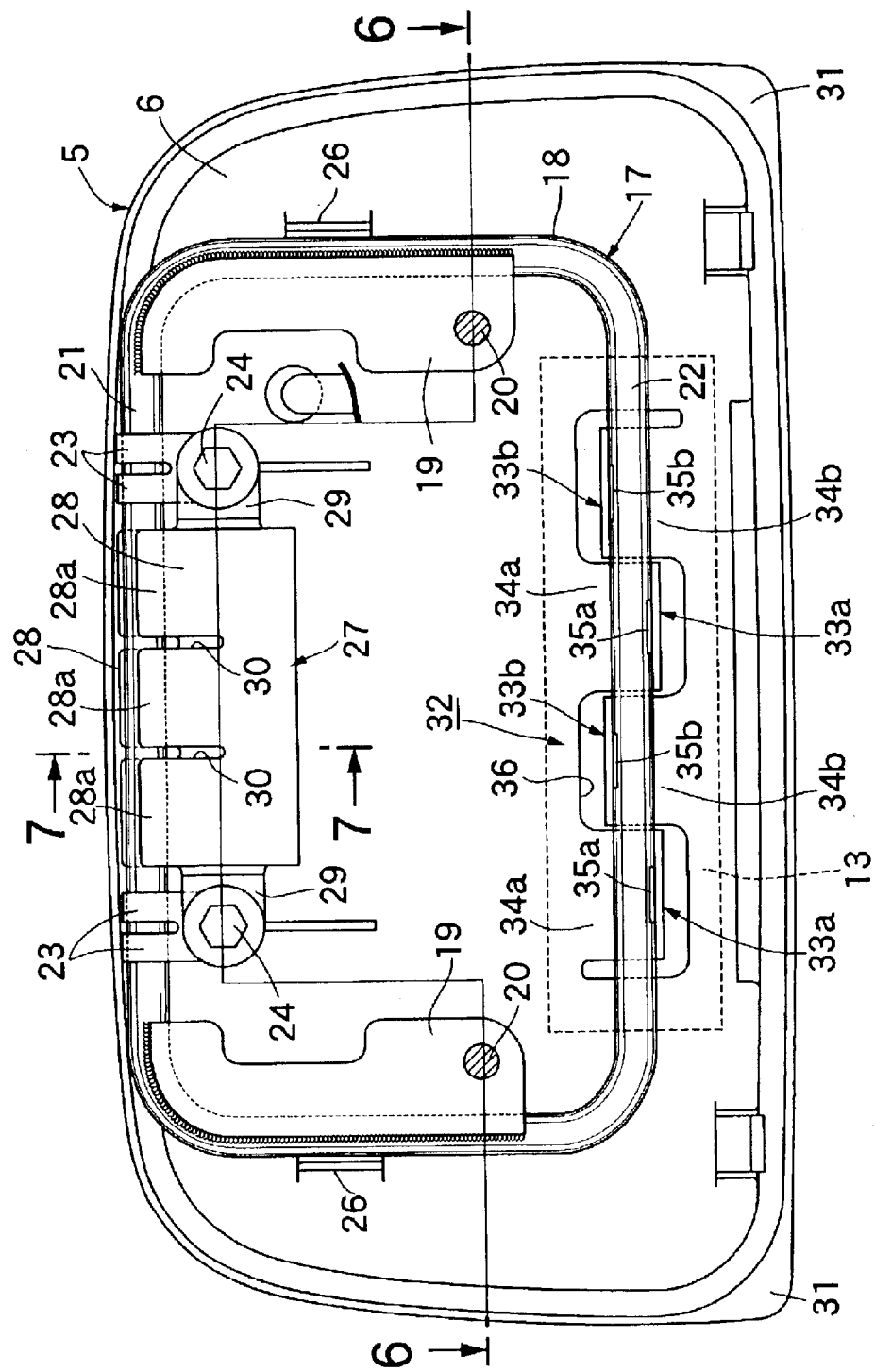
FIG. 5 is a sectional view taken along a line 5—5 in FIG. 4.

Referring first to FIGS. 4 and 5, a mounting member 17 for supporting the back plate 6 of the vanity mirror 5 is mounted on an inner wall of the trunk lid 2b. The mounting member 17 comprises a frame 18 made by bending a round bar into an oblong shape, and a pair of mounting plates 19 welded to left and right shorter sides of the frame 18. The mounting plates 19 are secured to the inner wall of the trunk lid 2b by bolts 20. An upper longer side 21 of the frame 18 serves as a pivot for turnably supporting the back plate 6, and a lower longer side 22 of the frame 18 serves as a retaining shaft for retaining the vanity mirror 5 in a housed position A in which it is superposed on the inner wall of the trunk lid 2b.

Figure 6:
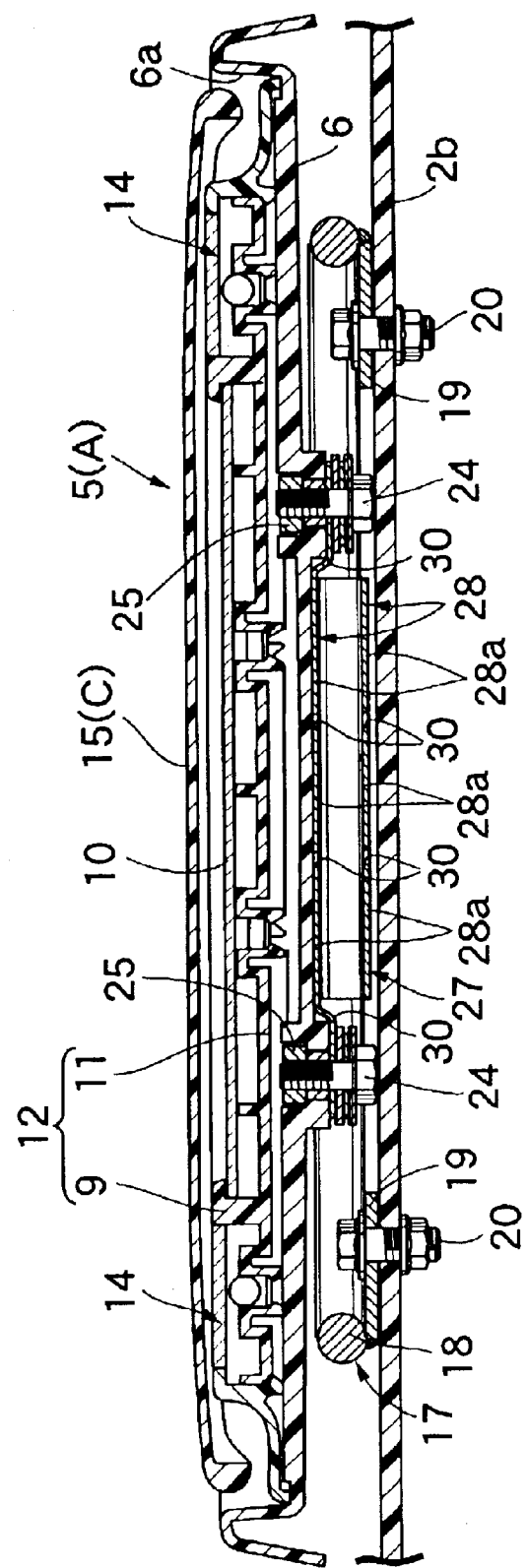
FIG. 6 is a sectional view taken along a line 6—6 in FIG. 5.
Figure 7:
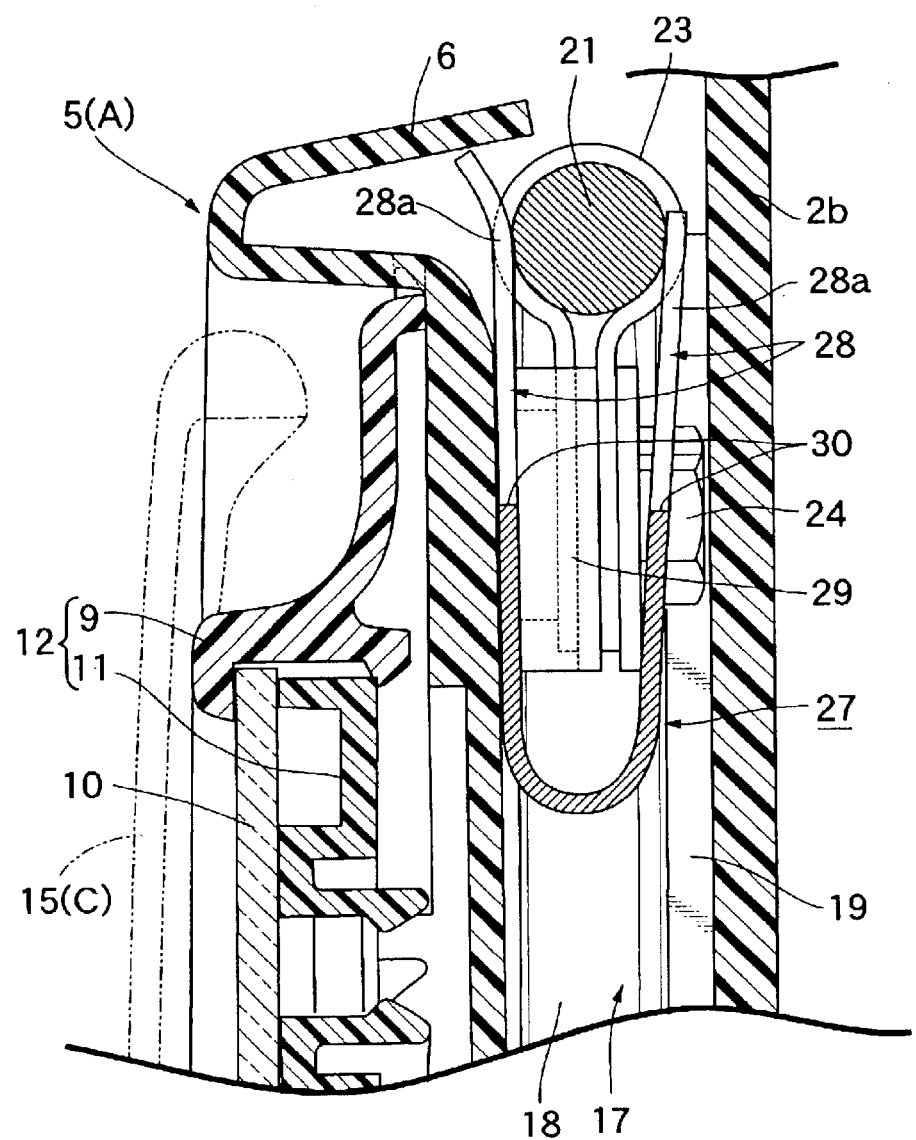
FIG. 7 is a sectional view taken along a line 7—7 in FIG. 5.

More specifically, as shown in FIGS. 5 to 7, the pivot 21 supports a pair of left and right bearing members 23, 23 secured to an upper portion of a back of the back plate 6 of the vanity mirror 5 by bolts 24 and nuts 25. Each of the bearing members 23, 23 is formed by bending a steel plate along an outer periphery of the pivot 21, and securing its opposite ends superposed on each other to the back plate 6 by the bolt 24 and the nut 25. When the opposite ends are secured, a moderate tightening force to the pivot 21 is applied to the bearing members 23, 23. To define positions at which the bearing members 23, 23 and the pivot 21 are fitted with each other, a pair of positioning projections 26, 26 are formed on the back plate 6 such that they are opposed to left and right opposite outer sides of the frame 18 in the housed position of the vanity mirror 5.

The vanity mirror 5 is turnable about the pivot 21 between the housed position A and any use position B. A retaining member 27 for retaining the back plate 6 at any use position B is secured along with the bearing members 23, 23 to the back plate 6 by the bolts 24 and the nuts 25. The retaining member 27 is constructed of a pair of resilient clamping plates 28, 28 which are made of steel for resiliently clamping opposite sides of the pivot 21 between the left and right bearing members 23, 23 and which are connected to each other into a U-shape. Ear pieces 29, 29 projectingly provided at left and right opposite ends of one of the resilient clamping plates 28, 28 are secured along with the bearing members 23, 23 to the back plate 6. A tip end of each of the resilient clamping plates 28, 28 is divided by a plurality of slits 30 into a plurality of resilient pieces 28a each of which can be independently brought into pressure-contact with an outer peripheral surface of the pivot 21.

A finger-put portion 31 is projectingly provided at each of left and right corners of a lower portion of the back plate 6 and used for turning the back plate 6 into the use position B.

As also shown in FIGS. 4 and 5, a clip means 32 for retaining the vanity mirror 5 in the housed position A by cooperation with the retaining shaft 22, is provided at a lengthwise central portion of the back plate 6. The clip means 32 is constructed from a pair of clip pieces 33a and 33b for grasping upper and lower opposite sides of the retaining shaft 2. In the illustrated embodiment, two sets of pairs of the clip pieces 33a and 33b are mounted. In this case, a crank-shaped slit 36 is defined in the back plate 6 so that each of the clip pieces 33a and 33b is formed by a portion of the back plate 6.

The pair of clip pieces 33a and 33b comprise a pair of curb-shaped resilient finger portions 34a and 34b rising from the back plate 6 and intersecting each other immediately before the retaining shaft 22, and claw portions 35a and 35b formed at tip ends pf the resilient finger portions 34a and 34b, respectively. The claw portions 35a and 35b are brought into engagement with one side of the retaining shaft 22 opposite from base ends of the resilient finger portions 34a and 34b by resilient forces of the resilient finger portions 34a and 34b.

The cushion member 13 interposed between the back plate 6 and the mirror support 12 is disposed at a location corresponding to the clip means 32.

Next, the operation of the present embodiment will be described below.

When a user uses the vanity mirror, the cover 15 is first opened downwards in the opened state of the trunk lid 2b, as shown in FIG. 2, and the user puts his finger on the finger-put portion 31 at the lower portion of the back plate 6 and pulls it to his side. Thus, each pair of the clip pieces 33a and 33b are disengaged from the retaining shaft 22, and the bearing members 23, 23 of the back plate 6 are rotated about the pivot 21, whereby the vanity mirror 5 is turned upwards. In this process, the pair of resilient clamping plates 28 rotating in unison with the bearing members 23, 23 continue to clamp the outer peripheral surface of the stationary pivot 21, while sliding on the outer peripheral surface. If the user then releases his hand from the finger-put portion 31 in the use position B, the opposed resilient clamping plates 28, 28 generate a large rotational resistance due to the friction between the resilient clamping plates 28 and the pivot 21 by their clamping forces, in addition to a rotational resistance due to the friction between the bearing members 23, 23 and the pivot 21, whereby the vanity mirror 5 can be retained at the use position B. Especially, the resilient clamping plates 28, 28 always exhibit the constant clamping forces to the pivot 21, and hence the rotational resistance to the pivot 21 is always stabilized, irrespective of the magnitude of the tightening forces applied to the pivot 21 by the bearing members 23, 23, whereby the vanity mirror 5 can be reliably retained at any use position B. Therefore, the tightening force applied to the pivot 21 by the bearing members 23, 23 may be as large enough as the looseness is not generated between the bearing members 23, 23 and the pivot 21, so that it is unnecessary to strictly manage the tightening force. This can contribute to an enhancement in assemblability. Moreover, the retaining member 27 is placed utilizing a relatively large space between the pair of bearing members 23, 23, and hence an increase in size of the vanity mirror device is avoided.

The tip end of each of the resilient clamping plates 28, 28 is divided by the plurality of slits 30 into the plurality of resilient pieces 28a each of which is independently brought into pressure-contact with the pivot 21, and hence each of the resilient pieces 28a can be brought reliably over its entire width into pressure-contact with the pivot 21. Therefore, the resistance due to the friction between the resilient clamping plate 28 and the pivot 21 can be further stabilized. Moreover, the force of pressure-contact of the resilient clamping plate 28 with the pivot 21 can be regulated by adjusting the width of the slits 30.

Further, the pair of left and right ear portions 29, 29 of the retaining member 27 are secured along with the pair of left and right bearing members 23, 23 to the back plate 6 by the common bolts 24 and nuts 25. Therefore, it is possible to provide a reduction in the number of parts, to thereby contribute to a further enhancement in assemblability and a reduction in cost.

If lamps of the illumination units 14, 14 are lighted, the vanity mirror 5 can be used at night, and also luggage within the trunk box 2a can be seen.

After use of the vanity mirror 5, if the cover 15 is closed and urged toward the inner wall of the trunk lid 2, the vanity mirror 5 is returned to the use position B in which it is superposed on the inner wall of the trunk lid 2b, and the retaining shaft 22 is received and grasped between the claw portions 35a and 35b of each pair of the clip pieces 33a and 33b, whereby the vanity mirror 5 is retained at the housed position A.

Figure 8:
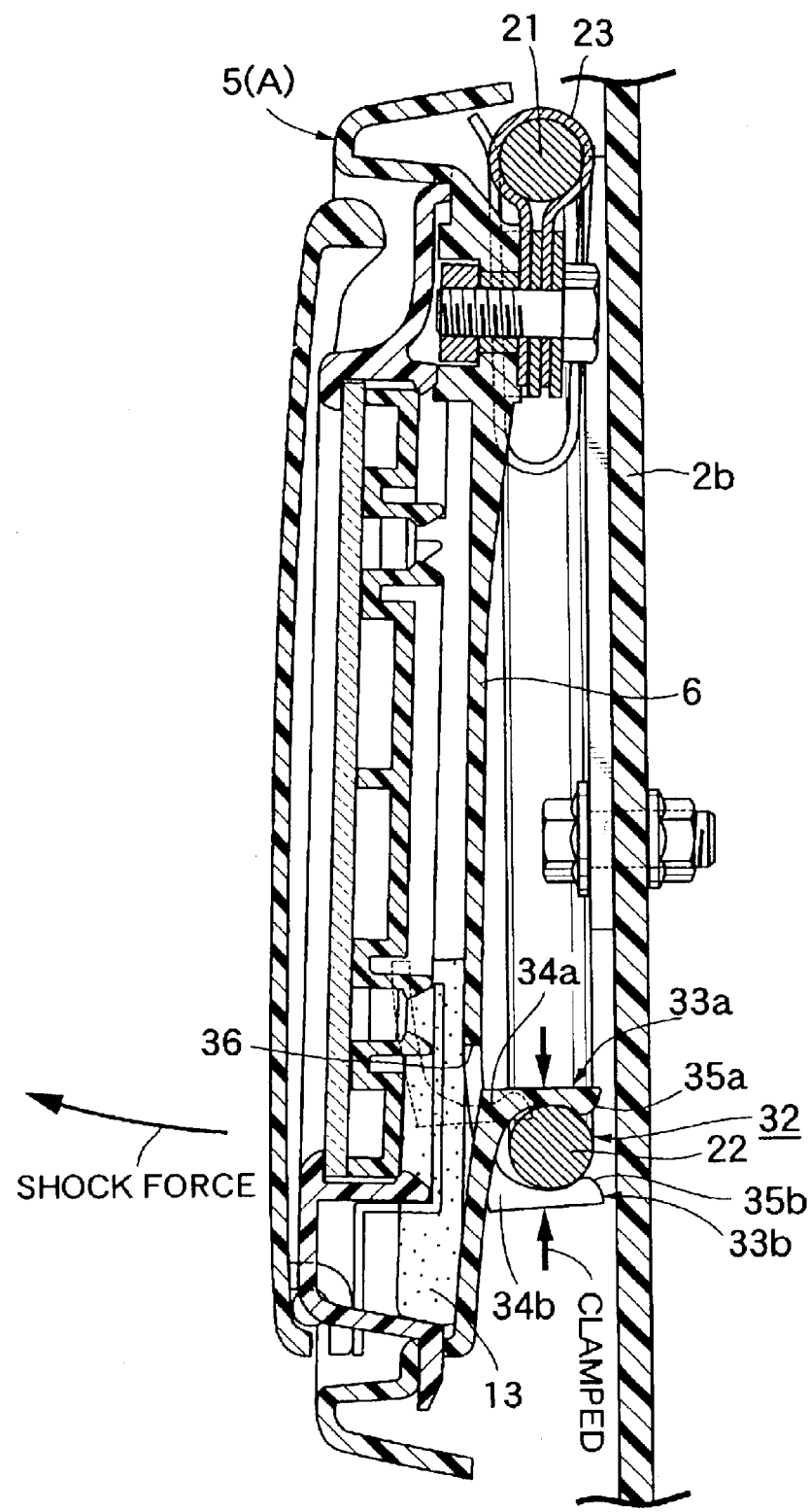
FIG. 8 is a view for explaining the operation of a vanity mirror device.
Figure 9:
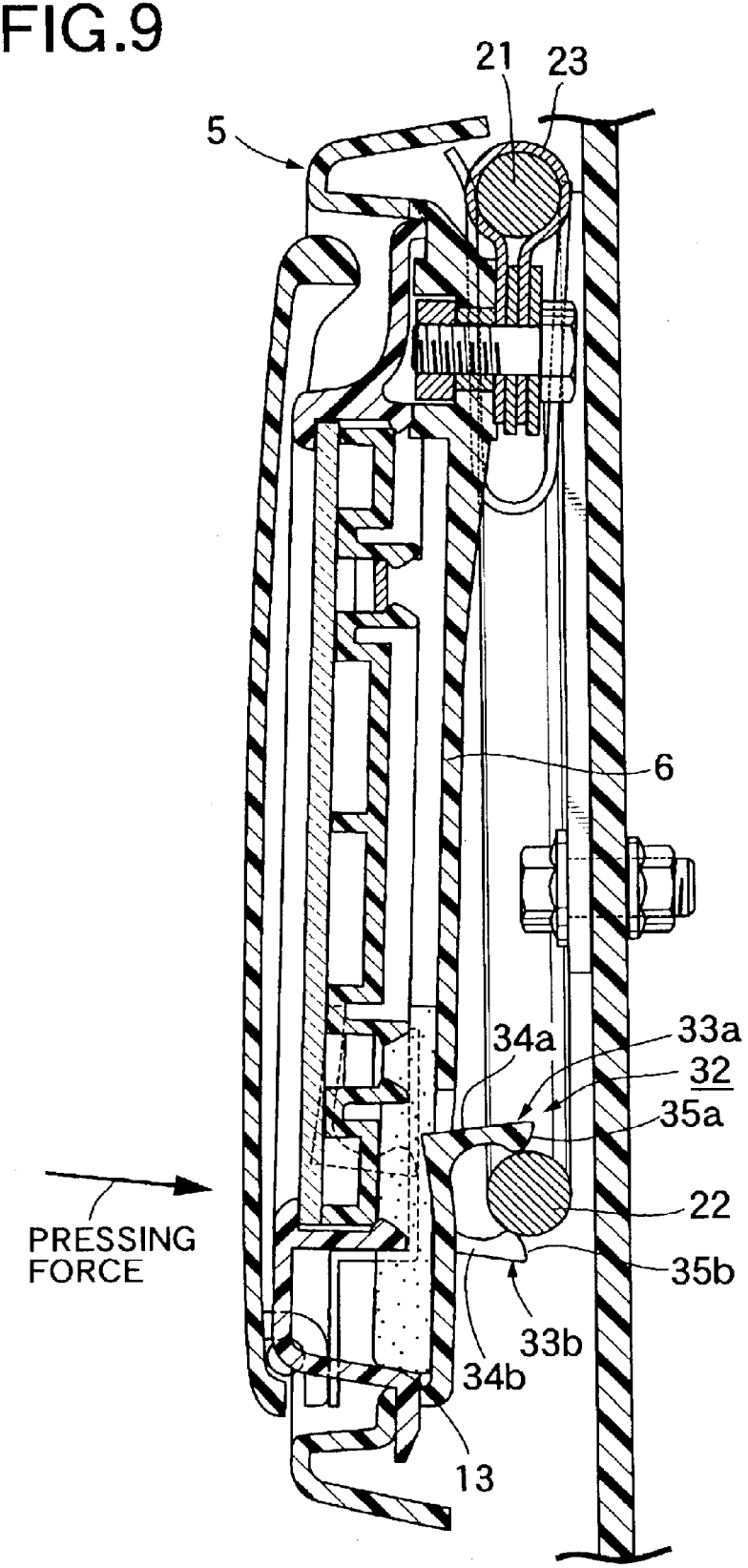
FIG. 9 is a view for explaining another operation of a vanity mirror device.

The resilient finger portions 34a and 34b of the pair of clip pieces 33a and 33b rising from the back of the back plate 6 intersect each other immediately before the retaining shaft 22, and the claw portions at their tip ends are brought resiliently into engagement with one side of the retaining shaft 22 opposite from the base ends of the resilient finger portions 34a and 34b, as described above. Therefore, when the retaining shaft 22 is pushed into between the claw portions 35a and 35b, as shown in FIG. 9, the resilient finger portions 34a and 34b are flexed to widen the space between the claw portions 35a and 35b in response to the pushing of the retaining shaft 22. Thus, the retaining shaft 22 is pushed into between the claw portions 35a and 35b by a relatively small urging force. On the other hand, when the vanity mirror 5 is retained at the housed position A as shown in FIG. 8, if a shock force is applied to pull the clip pieces 33a and 33b away from the retaining shaft 22, the resilient finger portions 34a and 34b are flexed in response to the shock force and narrow the space between the claw portions 35a and 35b. Therefore, the frictional resistance between the claw portions 35a and 35b and the retaining shaft 22 is increased, leading to an increase in force for retaining the clip pieces 33a and 33b on the retaining shaft 22. As a result, in the housed state of the vanity mirror 5, the vanity mirror 5 can be prevented from voluntarily turning from the housed position, despite the vertical vibration during traveling of the motorcycle.

Thus, the retaining force in the housed position A of the vanity mirror 5 can be increased, while enabling the easy returning of the vanity mirror 5 from the use position B to the housed position A.

On the other hand, to operate the vanity mirror 5 from the housed position A to any use position B, the user pulls left or right finger-put portion 31 at the lower portion of the back plate 6 to his side, and hence a slight resilient deformation occurs in the back plate 6 because the clip means 32 is located at the lengthwise central portion and made of the synthetic resin, whereby the claw portions 35a and 35b of the pair of clip pieces 33a and 33b are disengaged from the retaining shaft 22 sequentially from one side. As a result, the clip pieces 33a and 33b can be disengaged from the retaining shaft 22 by a relatively small operating force.

When the vanity mirror 5 has been returned vigorously from the use position B to the housed position A, a shock force generated at that time is transmitted to the back plate 6. However, the shock force is absorbed by the cushion member 13 between the back plate 6 and the mirror support 12, so that it is possible to suppress the generation of an abnormal sound due to the shock vibration of the back plate 6.

The present invention is not limited to the above-described embodiment, and various modifications in design may be made without departing from the scope of the invention defined in the claims. For example, the pivot 21 and the retaining shaft 22 are formed integrally on the frame 18 secured to the trunk lid 2b in the embodiment, but they may be separated from the each other and secured individually to the trunk lid 2b.

What is claimed is:

1. A vanity mirror device for a trunk, comprising:

a back plate of a vanity mirror, which is carried on a pivot mounted on an inner wall of a trunk lid and turned between a housed position in which the vanity mirror is superposed on the inner wall of the trunk lid and any use position; and a clip means mounted on the back plate for grasping a retaining shaft provided on the inner wall of the trunk lid in the housed position of the back plate, wherein the clip means is constructed of at least a pair of clip pieces comprising:

a pair of resilient finger portions rising from the back plate and intersecting each other immediately before the retaining shaft; and claw portions formed at tip ends of the resilient finger portions and brought into engagement with one side of the retaining shaft opposite from base ends of the resilient finger portions by resilient forces of the resilient finger portions.

2. A vanity mirror device for a trunk according to claim 1, wherein the back plate is made of a synthetic resin, and has crank-shaped slits defined therein so that each of the clip pieces is formed by a portion of the back plate.

3. A vanity mirror device for a trunk according to claim 2, wherein finger-put portions are provided at corners of the back plate spaced apart from the clip pieces in an axial direction of the retaining shaft so that a user can put his fingers on the finger-put portions to turn the vanity mirror to the use position.

4. A vanity mirror device for a trunk according to any of claims 1 to 3, wherein the vanity mirror is constructed by coupling a mirror support supporting a mirror plate thereon to the back plate, and a cushion member is interposed between the back plate and the mirror support.

5. A vanity mirror device for a trunk according to claim 1, wherein a pair of bearing members rotatably supported on the pivot are secured to the back plate of the vanity mirror, and a retaining member is mounted to the back plate, the retaining member comprising a pair of resilient clamping plates which are connected to each other into a U-shape and which are capable of clamping opposite sides of the pivot between the bearing members to retain the vanity mirror in any use position.

6. A vanity mirror device for a trunk according to claim 5, wherein a tip end of each of the resilient clamping plates is divided by a plurality of slits into a plurality of resilient pieces each of which is independently brought into pressure-contact with the pivot.

7. A vanity mirror device for a trunk according to claim 5 or 6, wherein the retaining member has a pair of ear portions integrally formed at its opposite sides and secured along with the bearing members to the back plate by common securing members.

* * * * *